United States Patent
Lin et al.

(10) Patent No.: US 10,719,254 B2
(45) Date of Patent: *Jul. 21, 2020

(54) MERGING DATA FROM SINGLE-LEVEL CELL BLOCK TO MULTIPLE-LEVEL CELL BLOCK BASED ON SUDDEN POWER OFF EVENT AND VALID PAGE COUNT IN SINGLE-LEVEL CELL BLOCK

(71) Applicant: Silicon Motion, Inc., Jhubei (TW)

(72) Inventors: Wen-Sheng Lin, Kaohsiung (TW); Yu-Da Chen, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,722

(22) Filed: Jul. 19, 2018

(65) Prior Publication Data
US 2019/0146704 A1    May 16, 2019

(30) Foreign Application Priority Data
Nov. 13, 2017   (TW) .............................. 106139137 A

(51) Int. Cl.
*G06F 3/06*    (2006.01)

(52) U.S. Cl.
CPC .......... *G06F 3/0647* (2013.01); *G06F 3/0619* (2013.01); *G06F 3/0659* (2013.01); *G06F 3/0679* (2013.01); *G06F 3/061* (2013.01); *G06F 3/064* (2013.01)

(58) Field of Classification Search
CPC .... G06F 3/0647; G06F 3/0619; G06F 3/0659; G06F 3/0679; G06F 3/064; G06F 3/061

USPC ......... 711/103, 165; 714/25, 47.1, 47.2, 48; 365/238.5; 713/193

See application file for complete search history.

(56) References Cited

U.S. PATENT DOCUMENTS

| 9,349,479 B1 * | 5/2016 | Sehgal ............... G11C 16/3427 |
| 10,592,157 B2 * | 3/2020 | Lin ....................... G06F 3/0647 |
| 2009/0327591 A1 * | 12/2009 | Moshayedi ......... G06F 11/1441 |
| | | 711/103 |

(Continued)

FOREIGN PATENT DOCUMENTS

| CN | 101494086 A | 7/2009 |
| CN | 102208210 A | 10/2011 |

(Continued)

*Primary Examiner* — Hong C Kim
(74) *Attorney, Agent, or Firm* — Winston Hsu

(57) ABSTRACT

A data storage device includes a memory device and a controller. The memory device includes multiple memory blocks. The memory blocks include single-level cell blocks and multiple-level cell blocks. The controller is coupled to the memory device. When the controller executes a predetermined procedure to write data stored in the single-level cell blocks into the multiple-level cell blocks, the controller is configured to determine whether a valid page count corresponding to each single-level cell block is greater than a threshold, and when the valid page count corresponding to more than one single-level cell block is greater than the threshold, the controller is configured to execute a first merge procedure to directly write the data stored in the single-level cell blocks with the valid page count greater than the threshold into one or more of the multiple-level cell blocks.

8 Claims, 5 Drawing Sheets

(56) References Cited

U.S. PATENT DOCUMENTS

| | | | | |
|---|---|---|---|---|
| 2012/0246397 A1* | 9/2012 | Nakai | ............... | G06F 12/0638 |
| | | | | 711/103 |
| 2013/0254458 A1* | 9/2013 | Pittelko | ............... | G06F 12/02 |
| | | | | 711/103 |
| 2013/0297986 A1* | 11/2013 | Cohen | ............... | G06F 11/1048 |
| | | | | 714/763 |
| 2014/0258602 A1* | 9/2014 | Yano | ............... | G06F 12/0246 |
| | | | | 711/103 |
| 2015/0039948 A1* | 2/2015 | Um | ............... | G06F 11/0706 |
| | | | | 714/710 |
| 2016/0092129 A1* | 3/2016 | Agarwal | ............... | G06F 3/0619 |
| | | | | 714/764 |
| 2016/0266791 A1* | 9/2016 | Lin | ............... | G06F 3/0688 |
| 2016/0284393 A1* | 9/2016 | Ramalingam | ............... | G11C 11/5628 |
| 2016/0364337 A1* | 12/2016 | Hale | ............... | G06F 12/0897 |

FOREIGN PATENT DOCUMENTS

| | | | |
|---|---|---|---|
| CN | 103309825 | A | 9/2013 |
| TW | 201308334 | A | 2/2013 |
| TW | 201329993 | | 7/2013 |
| TW | 201611035 | A | 3/2016 |
| TW | 201715530 | A | 5/2017 |
| TW | I602061 | B | 10/2017 |
| TW | 201738750 | A | 11/2017 |

\* cited by examiner

MERGING DATA FROM SINGLE-LEVEL CELL BLOCK TO MULTIPLE-LEVEL CELL BLOCK BASED ON SUDDEN POWER OFF EVENT AND VALID PAGE COUNT IN SINGLE-LEVEL CELL BLOCK

CROSS REFERENCE TO RELATED APPLICATIONS

This Application claims priority of Taiwan Patent Application No. 106139137, filed on Nov. 13, 2017, the entirety of which is incorporated by reference herein.

BACKGROUND OF THE INVENTION

Field of the Invention

The invention relates to a data processing method that is suitable for a flash memory device capable of efficiently processing the data stored in the memory device and further improving the performance of the memory device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In the following paragraphs, a novel data processing method is provided. By applying the data processing method, the data stored in the memory device can be efficiently processed and the performance of the memory device can be improved.

BRIEF SUMMARY OF THE INVENTION

A data storage device and methods for processing data stored in a memory device are provided. An exemplary embodiment of a data storage device comprises a memory device and a controller. The memory device comprises a plurality of memory blocks. The memory blocks comprise a plurality of single-level cell blocks and a plurality of multiple-level cell blocks. The controller is coupled to the memory device. When the controller executes a predetermined procedure to write data stored in the single-level cell blocks into the multiple-level cell blocks, the controller is configured to determine whether a valid page count corresponding to each single-level cell block is greater than a threshold, and when the valid page count corresponding to more than one single-level cell block is greater than the threshold, the controller is configured to execute a first merge procedure to directly write the data stored in the single-level cell blocks with the valid page count greater than the threshold into one or more of the multiple-level cell blocks.

An exemplary embodiment of a method for processing data stored in a memory device, suitable for a data storage device, the data storage device comprising a memory device and a controller, the memory device comprising a plurality of memory blocks, the memory blocks comprising a plurality of single-level cell blocks and a plurality of multiple-level cell blocks, the method comprising: determining whether a valid page count corresponding to each single-level cell block is greater than a threshold; and when the valid page count corresponding to more than one single-level cell block is greater than the threshold, executing a first merge procedure to directly write data stored in the single-level cell blocks with the valid page count greater than the threshold into one or more of the multiple-level cell blocks.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. It should be understood that the following embodiments may be implemented by software, hardware, firmware, or any combination of the above.

Figure 1A:
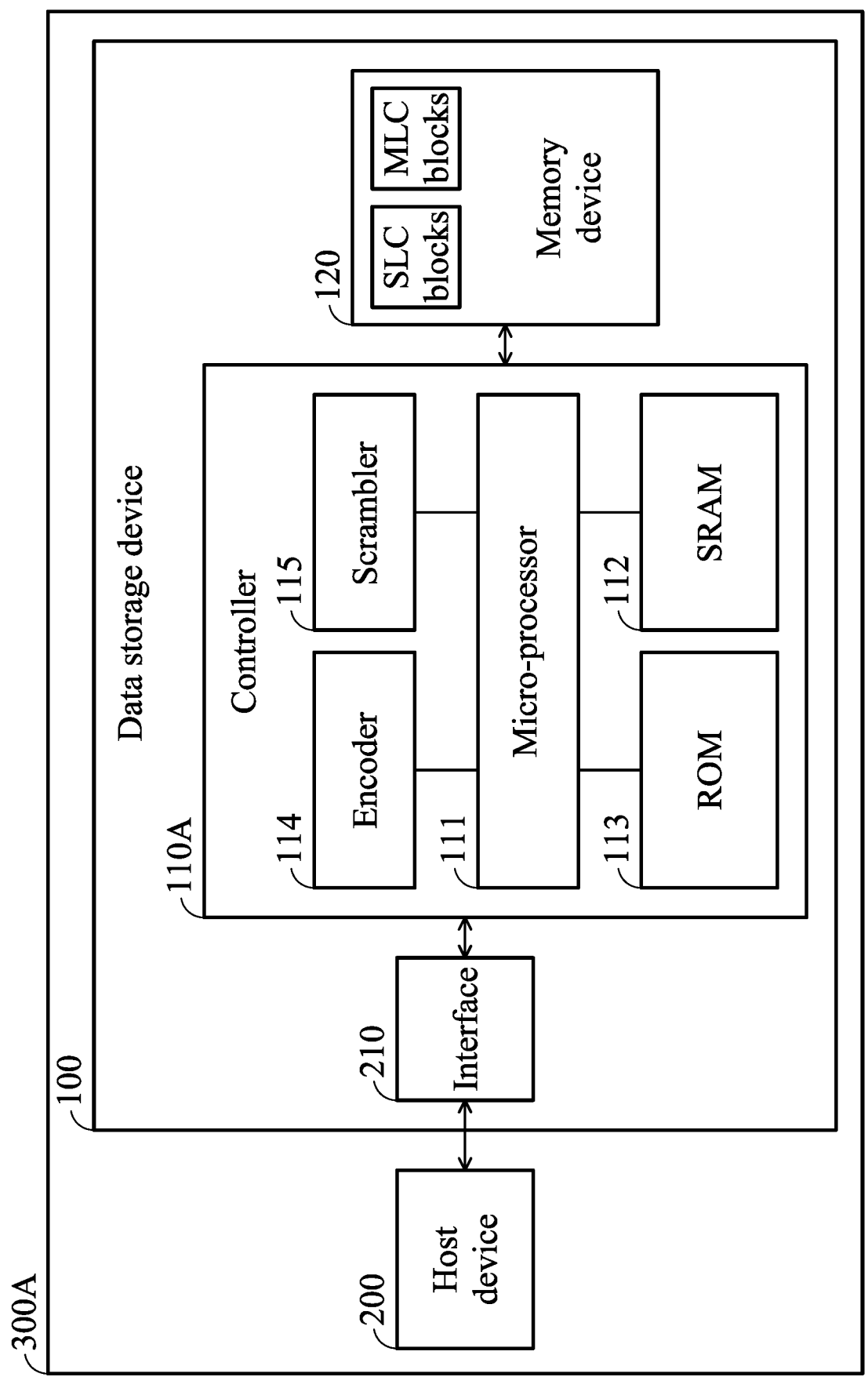
FIG. 1A shows an exemplary block diagram of an electronic device according to an embodiment of the invention.

FIG. 1A shows an exemplary block diagram of an electronic device according to an embodiment of the invention. The electronic device 300A may comprise a data storage device 100 and a host device 200. The electronic device 300A may be a mobile device, such as a smartphone, a smart watch, a tablet computer, etc., but the invention should not be limited thereto.

According to an embodiment of the invention, the data storage device 100 may comprise a controller 110A and a memory device 120. The controller 110A may comprise a micro-processor 111, a Static Random Access Memory (SRAM) 112, a Read Only Memory (ROM) 113, an encoder 114 and a scrambler 115. The memory device 120 may comprise one or more non-volatile memory devices, such as a flash memory.

The host device 200 and the data storage device 100 are connected to each other via a predetermined interface 210. For example, when the data storage device 100 conforms to the Universal Flash Storage (UFS) standards, the host device 200 and the data storage device 100 are connected to each other via the UFS interface. In another example, when the data storage device 100 conforms to the eMMC standards, the host device 200 and the data storage device 100 are connected to each other via the MMC interface.

Figure 1B:
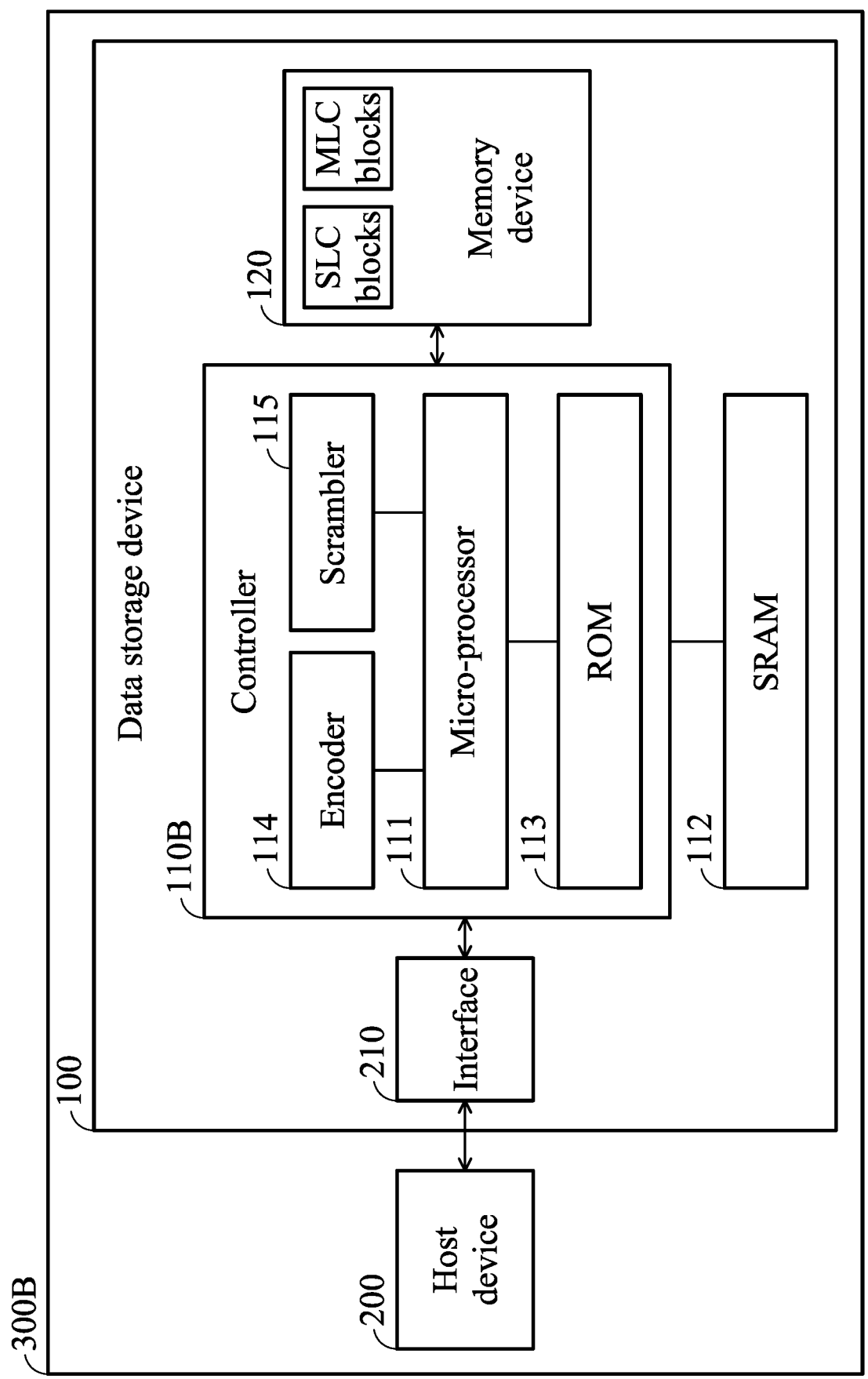
FIG. 1B shows a block diagram of an electronic device according to another embodiment of the invention.

FIG. 1B shows a block diagram of an electronic device 300B according to another embodiment of the invention. In this embodiment, the SRAM 112 is configured outside of the controller 110B and is coupled to the controller 110B.

It should be noted that, to simplify the description, FIG. 1A and FIG. 1B only show the elements related to the invention, and FIG. 1A and FIG. 1B only show two kinds of a plurality of architectures to which the invention can be applied. However, the implementation of the invention is not limited to the elements and architectures shown in FIG. 1A and FIG. 1B.

According to an embodiment of the invention, the memory device 120 may comprise a plurality of memory blocks. The memory blocks may be further grouped into a plurality of Single-level cell (SLC) blocks and/or a plurality of Multiple-level cell (MLC) blocks. Each memory cell in the SLC block stores one bit data, and each memory cell in the MLC block stores multiple bits of data. For example, according to an embodiment of the invention, each memory cell in the MLC block stores two bits of data. According to another embodiment of the invention, the MLC block may be the Triple-level cell (TLC) block, and each memory cell in the TLC block stores three bits of data.

Each memory block may comprise a plurality of pages. Generally, in the flash memory device, one page is a minimum data block unit for a write task, and one block is a minimum data block unit for an erase task. The size of a physical page is fixed, and the size of a logical page can be flexibly designed according to the firmware programming requirements.

Generally, in order to stabilize the programming of the MLC/TLC block, multiple pages of data (for example, two or three physical pages of data) have to be written in each programming operation. Therefore, the SLC blocks of the memory device 120 may be utilized as the cache memory or the buffer for temporarily buffering data. When the utilization rate of the SLC blocks reaches a predetermined threshold, the controller 110A/110B is configured to execute a predetermined procedure to write the data that is currently stored in the SLC blocks into MLC/TLC block(s). When the predetermined procedure is completed, the memory space of the SLC blocks can be released and the SLC blocks can be used again.

In the predetermined procedure, the data stored in more than one SLC block will be written into one or more MLC/TLC blocks. Take the TLC block as an example, the controller is configured to collect or combine the amount of data that is equal to the amount of data can be stored in three SLC blocks, and then write the collected data into the TLC block.

However, sometimes, the data stored in the SLC block may already become invalid. For example, when the data stored in a certain page(s) of the SLC block is a duplicate of the data stored in other block and the data stored in the page(s) of the SLC block is not the latest stored one, the data stored the page(s) will be determined as invalid data, and the page(s) will be regarded as invalid page(s) (also called expired page(s)). Therefore, in the proposed data processing method, the number of invalid page(s) is further considered in the procedure of writing the data stored in the SLC blocks into the MLC/TLC block, so as to process the data stored in the memory device more efficiently.

According to an embodiment of the invention, when the controller 110A/110B determines to execute the predetermined procedure, the controller 110A/110B is configured to determine whether a valid page count VP_Count corresponding to each SLC block is greater than a threshold TH. For example, the controller 110A/110B may establish a first table in the SRAM 112 or the memory device 120 for recording the a valid page count VP_Count corresponding to each memory block, wherein the basic unit for recording the valid page count of one page may be one logical page. Therefore, the maximum possible value of the valid page count VP_Count is the number of logical pages comprised in one memory block, and the minimum value thereof is 0. The controller 110A/110B usually updates the content of the first table after each write operation.

To be more specific, suppose that the controller 110A/110B writes the data of one host page into a memory block B, where one host page may be set as the data block unit for an access task, and when the size of one physical page is 16K bytes, the size of one host page may be set as 4K bytes. When the controller 110A/110B determines that the data of the same host page has already been written in the memory block A, the controller 110A/110B is configured to decrement the corresponding valid page count VP_Count of the memory block A by one, and add one to the corresponding valid page count VP_Count of the memory block B since the data of the same host page in the memory block A becomes invalid at the time when the controller 110A/110B writes the data of this host page into a memory block B.

According to an embodiment of the invention, the controller 110A/110B may establish a second table in the SRAM 112 or the memory device 120 for recording which page of which memory block the data of one host page is stored in. Therefore, the controller 110A/110B may query the second table to find out whether the host page has already been stored in another memory block.

When the valid page count VP_Count corresponding to more than one single-level cell block is greater than the threshold TH, the controller 110A/110B is configured to execute a first merge procedure to directly write the data stored in the single-level cell blocks with the valid page count greater than the threshold into one or more of the multiple-level cell blocks.

According to an embodiment of the invention, the first merge procedure is called a direct merge procedure. Take the TLC block as an example, when the valid page counts VP_Count corresponding at least three SLC blocks are greater than the threshold TH, the controller 110A/110B may determine to perform the direct merge procedure. The controller 110A/110B is configured to combine three SLC blocks having the corresponding valid page count VP_Count greater than the threshold TH into one group. The controller 110A/110B is configured to sequentially read the data stored in the SLC blocks of the group (that is, directly read all the data stored in the SLC blocks regardless of whether the invalid page exist or not), and sequentially write the read data into one TLC block. Generally, a read operation is accompanied by a write operation. Since the data read out from the SLC block is directly written into the TLC block without passing through the controller, the advantage of the direct merge procedure is that it is fast.

On the other hand, when the controller 110A/110B finds out that the valid page count VP_Count corresponding any SLC block is not greater than the threshold TH, the controller 110A/110B is configured to execute a second merge procedure. In the second merge procedure, the controller 110A/110B is configured to pick up the SLC blocks having the corresponding valid page count VP_Count not greater than the threshold TH from the unprocessed SLC blocks, combine the data stored in the valid pages of the picked up SLC blocks, and then write the data into one of the multiple-level cell blocks.

According to an embodiment of the invention, the second merge procedure may be an application of the on-buffer program (OBP) merge procedure. Take the TLC block as an example, when the controller 110A/110B finds out that the valid page count VP_Count corresponding one SLC block is not greater than the threshold TH, the controller 110A/110B is configured to determine to perform the OBP merge procedure on the SLC block.

To be more specific, in the OBP merge procedure, when the controller 110A/110B determines that the data stored in one physical page (for example, one 16K bytes physical page) of an SLC block is all valid data, the controller 110A/110B is configured to keep the valid data being stored in the original SLC block instead of reading the valid data out.

When the controller 110A/110B determines that the data stored in one physical page of an SLC block is not all valid data, the controller 110A/110B is configured to read the valid data stored in the SLC block out and store the read valid data in the buffer. The controller 110A/110B is configure to keep detecting whether the data stored in the physical pages of the remaining SLC blocks is not all valid data. If the data stored in one or more physical pages of the remaining SLC blocks is not all valid data, the controller 110A/110B is configured to read the valid data stored out and store the read valid data in the buffer as discussed above. When the amount (for example, 16K bytes) of the valid data that can be written to one physical page has been collected in the buffer, the collected data will be written in a buffer block (hereinafter called the OBP block).

According to an embodiment of the invention, the controller 110A/110B may establish an OBP table in the SRAM 112 or the memory device 120. The OBP table may be utilized for recording which page of which block data to be written in each page of the destination TLC block is currently stored in, so as to facilitate the following OBP merge procedure. For example, the data to be written in one page of the destination TLC block may be currently stored in the original SLC block or may be stored in the OBP block.

Finally, when the amount of valid data that can be written to one TLC block has been collected, the data is read out one page by one page (for example, one physical page by one physical page) based on the information stored in the OBP table through the controller 110A/110B, and the corresponding random seed is queried based on the page number. After being scrambled by the scrambler 115 according to the corresponding random seed and encoded by the encoder 114, the processed data is stored into the corresponding page of the TLC block. In addition, the spare region of each page also stores the random seed utilized for scrambling the data thereof. When the data stored in that page is read, the data can be descrambled based on the random seed stored in the spare region.

Therefore, according to an embodiment of the invention, in the second merge procedure, when the controller 110A/110B determines that not all the data stored in one physical page of an SLC block is all valid data, the controller 110A/110B is configured to read the data stored in the valid page(s) (which is/are the logical page(s)) of the SLC block, and store the valid data in the buffer. When the amount of valid data (for example, 16K bytes) that can be written to on physical page has been collected in the buffer, the valid data is written into an OBP block. When the controller 110A/110B determines that the data stored in one physical page of an SLC block is all valid data, the controller 110A/110B is configured to keep the valid data being stored in the original SLC block instead of reading the valid data out. When the amount of valid data that can be written to a TLC block (that is, three SLC blocks, wherein the SLC blocks may be the original SLC block(s) or the OBP block(s), and the amount of valid data is calculated by adding up the amount of valid data stored in the original SLC block(s) and the amount of valid data stored in the OBP block(s)) has been collected, the valid data is written into one TLC block. Comparing to the direct merge (that is, the first merge procedure as discussed above), the advantage of the OBP merge (that is, the second merge procedure as discussed above) is to ensure that the data in the TLC block is all valid.

In the embodiments of the invention, the controller 110A/110B is configured to flexibly determine how to write the data stored in the single-level cell blocks into the multiple-level cell blocks based on the corresponding valid page count VP_Count. In this manner, for the memory blocks having more valid pages, the advantages of the direct merge procedure (that is, a procedure in which the data collection and data writing can be quickly completed) can be obtained, and for the memory blocks having fewer valid pages, the amount of invalid pages being written to the multiple-level cell block(s) can be reduced via the OBP merge procedure, making it more efficient for performing the subsequent garbage collection procedures or other data processing procedures on the multiple-level cell blocks.

Several embodiments of the proposed data processing method will be further discussed in the following paragraphs.

According to a first embodiment of the invention, the controller 110A/110B may first arrange the SLC blocks to be processed in the predetermined procedure in a process queue, so as to pre-group the SLC blocks based on the random seeds in advance. For example, when the controller 110A/110B sequentially writes data to the SLC blocks 0, 1, 2, . . . , different random seeds may also be allocated to the SLC blocks 0, 1, 2, . . . . To be more specific, suppose that three sets of random seeds are configured in the data storage device system, and each set comprises a plurality of different random seeds. Each random seed is used to scramble or disturb a physical page, and the three sets of random seeds are all different. For example, assuming that an SLC block comprises 10 physical pages, each set of random seeds may comprise 10 different random seeds, and the 30 random seeds comprised in the three sets of configured random seeds are also all different.

The controller 110A/110B may sequentially distribute the three sets of random seeds to the SLC blocks. For example, the controller 110A/110B may distribute the first set of random seeds to the SLC blocks 0, 3, 6, . . . etc., distribute the second set of random seeds to the SLC blocks 1, 4, 7, . . . etc., and distribute the third set of random seeds to the SLC blocks 2, 5, 8, . . . etc. It should be noted that the above examples are only used to clearly illustrate the concept of the invention, and the invention is not limited to the use of three different sets of random seeds. For example, a data storage device system can use more than three different sets of random seeds.

The scrambler 115 of the controller 110A/110B may scramble the data based on the random seed and then the data is stored in the SLC block. In addition, the spare region of each page also stores the corresponding random seed. When reading out the data, the data can be descrambled based on the random seed stored in the spare region.

Figure 2:
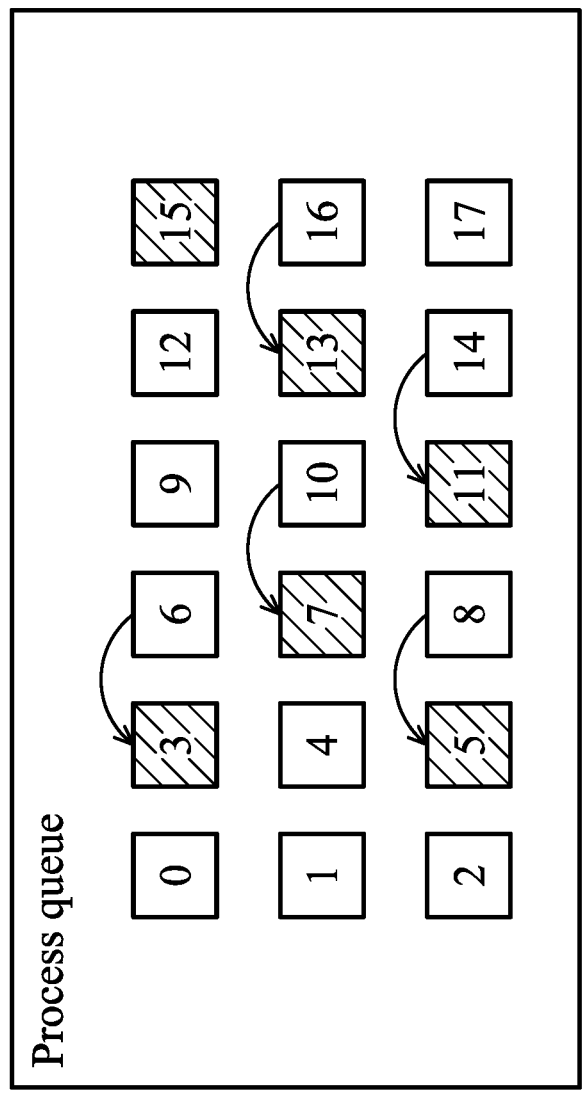
FIG. 2 shows an exemplary process queue according to an embodiment of the invention.

Since the controller 110A/110B already knows that the SLC blocks 0, 1 and 2 use different random seeds, the SLC blocks 3, 4 and 5 use different random seeds, the controller 110A/110B may arrange the SLC blocks to be processed in the predetermined procedure in a process queue as shown in FIG. 2, where the process queue may record the block number of the corresponding SLC blocks. In this manner, the three SLC blocks in each column of the process queue may be grouped together, and this can ensure that the SLC blocks in each group are scrambled based on different random seeds (that is, the data stored in each physical page in a group will be scrambled based on different random seeds).

After arranging the SLC blocks into the process queue, the controller 110A/110B is configured to sequentially determine whether a valid page count VP_Count corresponding to each SLC block is greater than a threshold TH. Suppose that, as shown in FIG. 2, the valid page counts VP_Count corresponding to the SLC blocks 3, 5, 7, 11, 13 and 15 are not greater than the threshold TH (in FIG. 2, the blocks filled with slashes are the blocks having the VP_Count<=TH), and the valid page counts VP_Count corresponding to the remaining SLC blocks are greater than the threshold TH.

According to an embodiment of the invention, after the controller 110A/110B determines that the valid page counts VP_Count corresponding to the SLC blocks 0, 1 and 2 are all greater than the threshold TH, the controller 110A/110B may determine to perform the first merge procedure on the SLC blocks 0, 1 and 2, so as to directly write the data currently stored in the SLC blocks 0, 1 and 2 into an TLC block. A similar process may keep going, until an SLC block having the corresponding valid page count VP_Count not greater than the threshold TH is detected.

Suppose that the valid page counts VP_Count corresponding to the SLC block 3 is not greater than the threshold TH, when the controller 110A/110B processes the SLC block 3, the controller 110A/110B is configured to determine to execute the second merge procedure. In the second merge procedure, the controller 110A/110B is configured to determine whether the data stored in physical pages of each SLC block is all valid. When the data stored in one physical page of an SLC block is not all valid, the controller is configured to read valid data of valid page(s) of the SLC block out and store the valid data of the valid page(s) in a buffer. When the data stored in one physical page of an SLC block is all valid, the controller is configured not to read valid data stored in the physical page out and keep the valid data in the original SLC block. When the amount of valid data that can be written to a TLC block (that is, three SLC blocks, wherein the SLC blocks may be the original SLC block(s) or the OBP block(s), and the amount of valid data is calculated by adding up the amount of valid data stored in the original SLC block(s) and the amount of valid data stored in the OBP block(s)) has been collected, the valid data is written into one TLC block.

When the second merge procedure is completed, the controller 110A/110B is configured to further rearrange the content of the process queue by removing the processed SLC blocks (that is, having all the valid data being written into the TLC block) from the process queue and replacing the removed SLC blocks by the unprocessed SLC blocks belonging to the same group (that is, in the same row). As the arrows shown in FIG. 2, when the SLC block 3 has been completely processed, the controller 110A/110B is configured to the move the block number of the SLC block 6 to the place in first row and the second column of the process queue, so as to replace the block number of the SLC block 3. When the SLC block 5 has been completely processed, the controller 110A/110B is configured to the move the block number of the SLC block 8 to the place in the third row and the second column of the process queue, so as to replace the block number of the SLC block 5, and so on. In this manner, it can ensure that the three SLC blocks grouped together in each column of the process queue will be scrambled based on different random seeds (that is, the data stored in each physical page in a group will be scrambled based on different random seeds).

Similarly, the controller 110A/110B is configured to further rearrange the content of the process queue as discussed above every time when the first merge procedure is completed.

In addition, after the second merge procedure is completed, the controller 110A/110B is configured to further process the remaining unprocessed SLC blocks based on the content of the process queue. The controller 110A/110B may keep determining whether a valid page count VP_Count corresponding to each SLC block is greater than a threshold TH and determining whether to execute the first merge procedure or the second merge procedure based on the determination result as discussed above.

In the first embodiment of the invention, the controller 110A/110B is configured to flexibly determine how to write the data stored in the single-level cell blocks into the multiple-level cell blocks based on the corresponding valid page count VP_Count. In this manner, for the memory blocks having more valid pages, the predetermined procedure can be completed quickly, and for the memory blocks having fewer valid pages, the amount of invalid pages being written to the multiple-level cell block(s) can be reduced via the second merge procedure, making it more efficient for performing the subsequent garbage collection procedures or other data processing procedures on the multiple-level cell blocks.

According to a second embodiment of the invention, the controller 110A/110B is configured to further establish a third table for recording the information regarding the random seeds configured for each SLC block in the SRAM 112 or the memory device 120. For example, the third table may record which group is the random seeds configured for each SLC block belonging to. When the controller 110A/110B determines to execute the predetermined procedure, the controller 110A/110B may check content of the first table and the third table and select multiple (for example, three) SLC blocks having different random seeds from the SLC blocks having the corresponding valid page count VP_Count greater than the threshold TH to form a group for executing the first merge procedure. After the groups of SLC blocks (that is, the groups of SLC blocks having the corresponding valid page count VP_Count greater than the threshold TH and having different random seeds) have been processed, the controller 110A/110B may further use the remaining SLC blocks to execute the second merge procedure as discussed above.

In the second embodiment of the invention, the controller 110A/110B is configured to process the SLC blocks having more valid pages prior than the other SLC blocks, so as to release the memory space quickly. After the SLC blocks having more valid pages have been processed, the controller 110A/110B is configured to process the SLC blocks having fewer valid pages. The amount of invalid pages being written to the multiple-level cell block(s) can be reduced via the second merge procedure, making it more efficient for performing the subsequent garbage collection procedures or other data processing procedures on the multiple-level cell blocks.

According to a third embodiment of the invention, when the controller 110A/110B determines to execute the predetermined procedure, the controller 110A/110B may also determine whether a sudden power off has occurred. According to an embodiment of the invention, when a sudden power off has occurred, a Sudden Power Off Recovery (SPOR) procedure will be performed when the system is powered up again, so as to reestablish the links between the tables and the data blocks. Therefore, when performing the SPOR procedure, the controller 110A/110B may set up a flag for indicating that a sudden power off has occurred. When the controller 110A/110B determines to execute the predetermined procedure, the controller 110A/110B may check whether the flag has been set to determine whether a sudden power off has occurred, first. If yes, the controller 110A/110B is configured to directly determine to execute a third merge procedure instead of determining whether the corresponding valid page count VP_Count of the SLC blocks is greater than the threshold TH. The third merge procedure is also an application of the OBP merge procedure. In the third merge procedure, the controller 110A/110B is configured to store the data stored in valid pages of the single-level cell blocks in the buffer for performing the merge operation. When the amount of valid data that can be written to a multiple-level cell block (that is, three SLC blocks when taking the TLC block as an example) has been collected in the buffer, the controller 110A/110B configures different random seeds for different physical pages and then writes the merged data into a multiple-level cell block. After the predetermined procedure is completed, the controller 110A/110B may reset the flag. In this manner, the controller 110A/110B may determine to perform the third merge procedure only when the first attempt to perform the predetermined procedure after a sudden power off has occurred.

It should be noted that in other embodiments of the invention, it is also possible to design the controller 110A/110B to count the number of times that a sudden power off occurs. When the number of times that the sudden power off has occurred exceeds a predetermined value, the controller 110A/110B sets up another flag for indicating that successive sudden power off has occurred. When the controller 110A/110B determines to execute the predetermined procedure, the controller 110A/110B may check whether the successive sudden power off flag is set, first. If yes, the controller 110A/110B is configured to directly determine to adopt the third merge procedure for executing the predetermined procedure. After the predetermined procedure is completed, the controller 110A/110B is configured to reset the successive sudden power off flag. In this manner, the controller 110A/110B may determine to perform the third merge procedure only when the first attempt to execute the predetermined procedure after successive sudden power off has occurred.

Generally, every time that a sudden power off has occurred, the system will use a new single-level cell block as the current cache memory. Therefore, the sudden power off and successive sudden power off would both cause a great number of invalid pages being generated in the SLC block. Therefore, in the third embodiment of the invention, the third merge procedure is executed prior than the other procedures when the first attempt to execute the predetermined procedure after a sudden power off or successive sudden power off has occurred.

Figure 3:
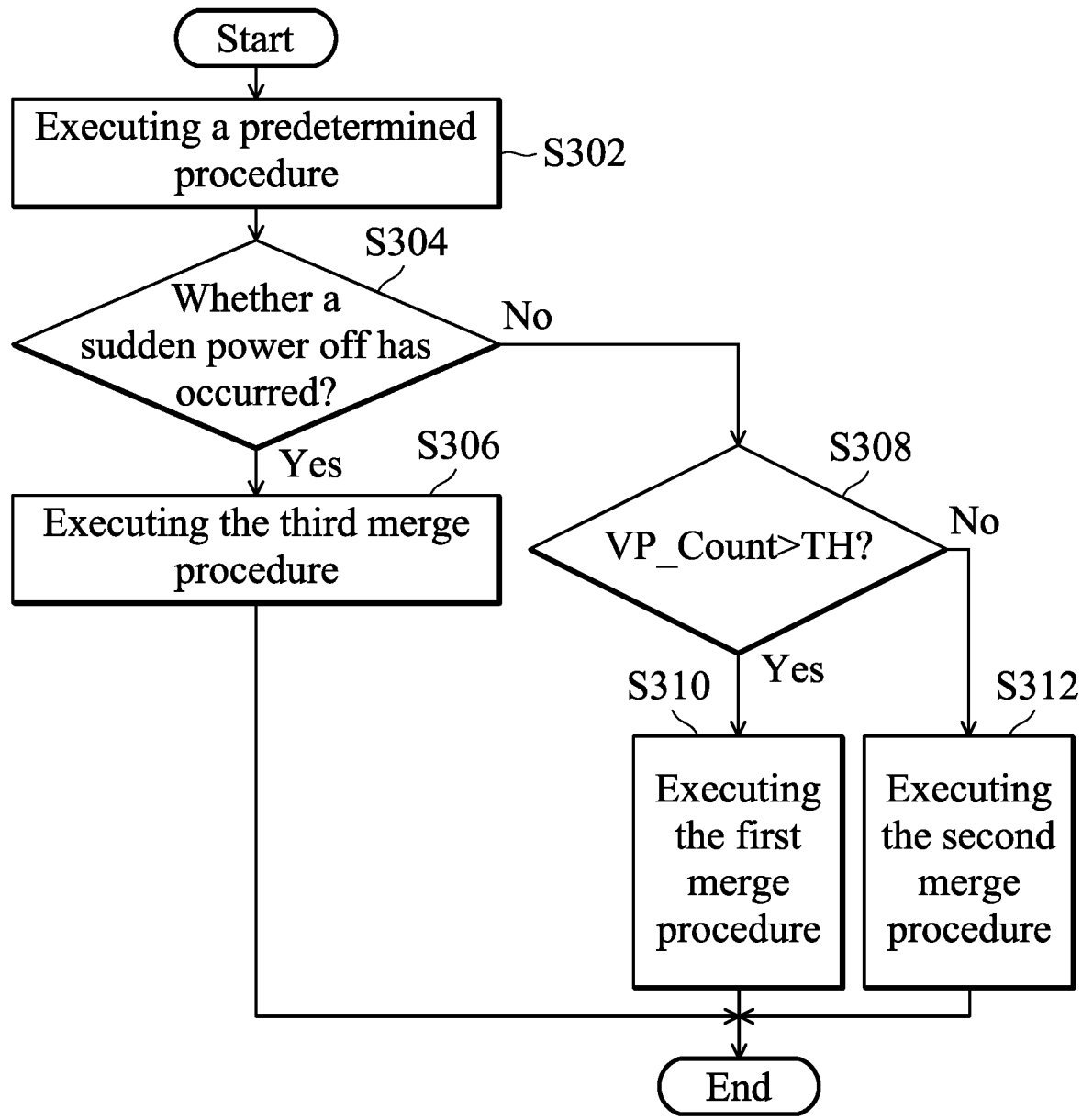
FIG. 3 is a flow chart of a method for processing data stored in the memory device of a data storage device according to an embodiment of the invention.

FIG. 3 is a flow chart of a method for processing data stored in the memory device of a data storage device according to an embodiment of the invention. The data storage device comprises a memory device and a controller. The memory device comprises a plurality of memory blocks, and the memory blocks are grouped into a plurality of single-level cell blocks and a plurality of multiple-level cell blocks. The single-level cell blocks are utilized for buffering data.

The flow chart shown in FIG. 3 covers the first, second and third embodiments of the invention. First of all, the controller determines to execute a predetermined procedure (Step S302) to write data stored in the single-level cell blocks into the multiple-level cell blocks, so as to release the memory space of the single-level cell blocks. Next, the controller determines whether a sudden power off has occurred (Step S304). If so, the controller is configured to execute the third merge procedure (Step S306). If not, the controller is configured to determine whether a valid page count corresponding to each single-level cell block is greater than a threshold TH (Step S308). If so, the controller is configured to execute the first merge procedure (Step S310) to directly write the data stored in the single-level cell blocks with VP_Count>TH into one or more of the multiple-level cell blocks. If not, the controller is configured to execute the second merge procedure (Step S312).

As discussed above, in the embodiments of the invention, the controller 110A/110B is configured to flexibly determine how to write the data stored in the single-level cell blocks into the multiple-level cell blocks based on the corresponding valid page count VP_Count. In this manner, for the memory blocks having more valid pages, the advantages of the direct merge procedure (that is, a procedure in which the data collection and data writing can be quickly completed) can be obtained, and for the memory blocks having fewer valid pages, the amount of invalid pages being written to the multiple-level cell block(s) can be reduced via the OBP merge procedure, making it more efficient for performing the subsequent garbage collection procedures or other data processing procedures on the multiple-level cell blocks. In addition, the OBP merge procedure is executed prior than the other procedures when the first attempt to execute the predetermined procedure after a sudden power off or successive sudden power off has occurred, so as to ensure that the data in the multiple-level cell block(s) is all valid.

Besides applying the predetermined procedure to write data stored in the single-level cell blocks into the multiple-level cell blocks as discussed above, according to a fourth embodiment of the invention, when programming the buffer, each physical page may be scrambled according to different random seeds via proper random seed configuration. Based on the random seed configuration, the merge procedures as discussed above can be performed more efficiently. As discussed above, in order to stabilize the programming of the MLC/TLC block, the SLC blocks of the memory device 120 may be utilized as the cache memory or the buffer for temporarily buffering data when the host device 200 wants to write data into the data storage device 100. When the utilization rate of the SLC blocks reaches a predetermined threshold, the controller 110A/110B is configured to execute the predetermined procedure as discussed above.

According to the fourth embodiment of the invention, the controller 110A/110B may configure different sets of random seeds for different SLC blocks, where each set of random seeds comprises a predetermined number of random seeds, and the random seeds comprised in each set are all different. For example, the controller 110A/110B may configure different sets of random seeds for different SLC blocks, such that when writing data, the scrambler 115 may perform data scrambling based on the corresponding random seed. Assuming that an SLC block comprises 10 physical pages, each set of random seeds may comprise 10 different random seeds, and the 30 random seeds comprised in the three sets of random seeds configured for three SLC blocks are all different.

To be more specific, in an embodiment of the invention, the controller 110A/110B may use a first SLC block as the buffer. When the controller 110A/110B receives the data to be written in the memory device 120 from the host device 200, the scrambler 115 performs data scrambling according to a first set of random seeds, and the encoder 114 encodes the scrambled data. The scrambled and encoded data is then written in the first SLC block.

When the first SLC block is full or when the utilization rate of first SLC block reaches a predetermined threshold, the controller 110A/110B can further use the second SLC block as the buffer. Similarly, when the controller 110A/110B receives the data to be written in the memory device 120 from the host device 200, the scrambler 115 performs data scrambling according to a second set of random seeds, and the encoder 114 encodes the scrambled data. The scrambled and encoded data is then written in the second SLC block.

When the second SLC block is full or when the utilization rate of second SLC block reaches a predetermined threshold, the controller 110A/110B can further use the third SLC block as the buffer. Similarly, when the controller 110A/110B receives the data to be written in the memory device 120 from the host device 200, the scrambler 115 performs data scrambling according to a third set of random seeds, and the encoder 114 encodes the scrambled data. The scrambled and encoded data is then written in the third SLC block. The procedure of writing data into the buffer may keep going in a similar way.

As discussed above, the first, second and third sets of random seeds respectively comprises a predetermined number of random sees, and the random seeds comprised in the first set of random seeds, in the second set of random seeds and in the third set of random seeds are all different.

In addition, when the scrambler 115 is performing data scrambling, the scrambler 115 is also configured to store the random seed used to scramble or disturb a physical page in the spare region of that physical page. When the data stored in that page is read, the data can be descrambled based on the random seed stored in the spare region. To be more specific, when reading the data, the controller 110A/110B reads the corresponding data out from the memory device and the original data can be obtained after the encoder 114 decoding the data and the scrambler 115 descrambling the decoded data based on the random seed stored in the spare region.

According to the fourth embodiment of the invention, since different sets of random seeds have already been configured to different SLC blocks and the random seeds configured to different physical pages are all different, when writing data into different SLC blocks, the data is already scrambled based on different random seeds. Therefore, when the controller 110A/110B determines to execute the direct merge procedure (that is, the first merge procedure as discussed above) to directly write the data stored in multiple single-level cell blocks into one multiple-level cell block, the controller 110A/110B can directly write the data stored in the single-level cell blocks into one multiple-level cell block.

As discussed above, the controller 110A/110B is configured to sequentially read the data stored in multiple (for example, three) SLC blocks, and sequentially write the read data into one TLC block. Generally, a read operation is accompanied by a write operation. For example, the controller 110A/110B may sequentially read the data stored in the first SLC block as discussed above and direct write the read data in the TLC block, read the data stored in the second SLC block as discussed above and direct write the read data in the same TLC block, and read the data stored in the third SLC block as discussed above and direct write the read data in the same TLC block.

According to an embodiment of the invention, the SLC blocks may be grouped into three groups, each group may correspond to one set of random seeds, and different group of SLC blocks are configured with different sets of random seeds. For example, the first group may comprise a first SLC block, a fourth SLC block . . . etc., and the controller 110A/110B may configure the first set of random seeds for the first group of SLC blocks. Similarly, the second group may comprise a second SLC block, a fifth SLC block . . . etc., and the controller 110A/110B may configure the second set of random seeds for the second group of SLC blocks. Similarly, the third group may comprise a third SLC block, a sixth SLC block . . . etc., and the controller 110A/110B may configure the third set of random seeds for the third group of SLC blocks. According to an embodiment of the invention, suppose that each of the three SLC blocks comprises only two SLC blocks, the controller 110A/110B may start the direct merge procedure immediately after one of the SLC blocks comprised in each group is full. Suppose that each of the three SLC blocks comprises three or more SLC blocks, the controller 110A/110B may start the direct merge procedure when the number of empty SLC blocks comprised in each group is less than a predetermined value.

Since in the direct merge procedure, the data of the SLC block is directly written into the TLC block without passing through the controller, the advantage of the direct merge procedure is that it is fast. In addition, since in the fourth embodiment of the invention, the controller 110A/110B has already configured different sets of random seeds for different SLC blocks, the random seeds configured for the first, second and third SLC blocks are all different, and the random seeds configured for each physical page of the first, second and third SLC blocks are all different. Via the configuration, the direct merge procedure can be executed in a more efficient way.

Figure 4:
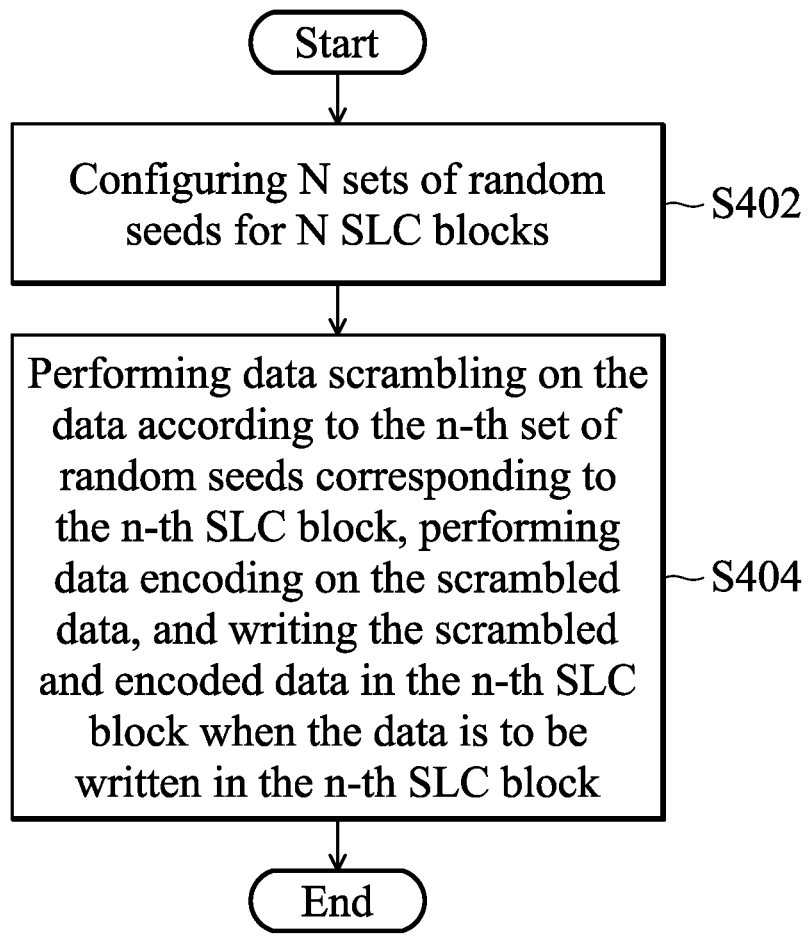
FIG. 4 is a flow chart of a method for processing data stored in the memory device of a data storage device according to another embodiment of the invention.

FIG. 4 is a flow chart of a method for processing data stored in the memory device of a data storage device according to another embodiment of the invention. First of all, different sets of random seeds are configured for different SLC blocks (Step S402). Suppose that N SLC blocks are utilized as the buffer, the controller 110A/110B may configure N sets of different random seeds, such that the random seeds for the SLC blocks are different, and the random seeds for different physical pages in each SLC block are also different, where N is a positive integer.

Next, when the controller 110A/110B plans to write the data in the n-th SLC block (where 0<n<N), the controller 110A/110B is configured to perform data scrambling on the data according to the n-th set of random seeds corresponding to the n-th SLC block, perform data encoding on the scrambled data, and write the scrambled and encoded data in the n-th SLC block (Step S404).

Compared to the prior art, in which when the data stored in the SLC blocks is to be to be organized and written into the TLC block, in order to ensure that the random seed of each physical page is not the same, the data read out from the memory device 120 has to be stored in the SRAM 112 first, and the data can be stored in the TLC block only after the controller has reconfigured the random seed and performed data scrambling/encoding on the data stored in the SRAM 112. In this may, the performance of the data storage device will be degraded. In the embodiments of the invention, by configuring the random seeds as discussed above, the above mentioned merge procedure can be performed in a more efficient way, and it can ensure that after the merge procedure, the data stored in different physical pages of the TLC is scrambled based on different random seeds.

The term "coupled" in the specification of the invention generally refers to various direct or indirect electrical connections. While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
   a memory device, comprising a plurality of memory blocks, wherein the memory blocks comprise a plurality of single-level cell blocks and a plurality of multiple-level cell blocks; and
   a controller, coupled to the memory device, wherein when the controller executes a predetermined procedure to write data stored in the single-level cell blocks into the multiple-level cell blocks, the controller is configured to determine whether a valid page count corresponding to each single-level cell block is greater than a threshold, and when the valid page count corresponding to more than one single-level cell block is greater than the threshold, the controller is configured to execute a first merge procedure to directly write the data stored in the single-level cell blocks with the valid page count greater than the threshold into one or more of the multiple-level cell blocks,
   wherein when the controller determines that the valid page count corresponding to one single-level cell block is not greater than the threshold, the controller is configured to execute a second merge procedure, wherein in the second merge procedure, the controller is configured to determine whether data stored in physical pages of an single-level cell block is all valid, and when the data stored in one physical page of the single-level cell block is not all valid, the controller is configured to read valid data of valid page(s) of the single-level cell block and store the valid data of the valid page(s) in a buffer, and when the amount of valid data that can be written to a multiple-level cell block has been collected in the buffer, the valid data is written into one of the multiple-level cell blocks.

2. The data storage device as claimed in claim 1, wherein the controller is further configured to select the single-level cell blocks having different random seeds from the single-level cell blocks with the valid page count greater than the threshold to perform the first merge procedure.

3. The data storage device as claimed in claim 1, wherein the multiple-level cell blocks are triple-level cell blocks and when the controller executes the first merge procedure, the controller is configured to directly write the data stored in three single-level cell blocks having different random seeds into one triple-level cell block.

4. The data storage device as claimed in claim 1, wherein when the controller executes the predetermined procedure, the controller is further configured to determine whether a sudden power off has occurred, and when a sudden power off has occurred, the controller is further configured to execute a third merge procedure, wherein in the third merge procedure, the controller is configured to merge the data stored in valid pages of the single-level cell blocks and write the merged data into the multiple-level cell blocks.

5. A method for processing data stored in a memory device, suitable for a data storage device, the data storage device comprising a memory device and a controller, the memory device comprising a plurality of memory blocks, the memory blocks comprising a plurality of single-level cell blocks and a plurality of multiple-level cell blocks, the method comprising:
   determining whether a valid page count corresponding to each single-level cell block is greater than a threshold; and
   when the valid page count corresponding to more than one single-level cell block is greater than the threshold, executing a first merge procedure to directly write data stored in the single-level cell blocks with the valid page count greater than the threshold into one or more of the multiple-level cell blocks; and
   when determining that the valid page count corresponding to one single-level cell block is not greater than the threshold, executing a second merge procedure, wherein the step of executing the second merge procedure comprises:
   determining whether data stored in physical pages of an single-level cell block is all valid; and
   when the data stored in one physical page of the single-level cell block is not all valid, reading valid data of valid page(s) of the single-level cell block and storing the valid data of the valid page(s) in a buffer; and
   when the amount of valid data that can be written to a multiple-level cell block has been collected in the buffer, writing the valid data into one of the multiple-level cell blocks.

6. The method as claimed in claim 5, further comprising:
   selecting the single-level cell blocks having different random seeds from the single-level cell blocks with the valid page count greater than the threshold to perform the first merge procedure.

7. The method as claimed in claim 5, wherein when the multiple-level cell blocks are triple-level cell blocks and when executing the first merge procedure, the data stored in three single-level cell blocks having different random seeds is directly written into one triple-level cell block.

8. The method as claimed in claim 5, further comprising:
   determining whether a sudden power off has occurred; and
   when a sudden power off has occurred, directly executing a third merge procedure instead of determining whether the valid page count corresponding to each single-level cell block is greater than the threshold;
   wherein the step of executing the third merge procedure comprises:
   merging data stored in valid pages of the single-level cell blocks; and
   writing the merged data into the multiple-level cell blocks.

* * * * *